United States Patent
Yamada et al.

(10) Patent No.: US 7,418,325 B2
(45) Date of Patent: Aug. 26, 2008

(54) SUSPENSION SYSTEM FOR VEHICLE

(75) Inventors: Daisuke Yamada, Anjo (JP); Shin Matsumoto, Toyota (JP); Shingo Urababa, Toyota (JP); Satoshi Suzuki, Mishima (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 255 days.

(21) Appl. No.: 11/283,901

(22) Filed: Nov. 22, 2005

(65) Prior Publication Data

US 2006/0116802 A1 Jun. 1, 2006

(30) Foreign Application Priority Data

Nov. 30, 2004 (JP) ............................. 2004-346544

(51) Int. Cl.
*B60G 17/016* (2006.01)
*B60G 23/00* (2006.01)
*G06F 17/00* (2006.01)

(52) U.S. Cl. .............................. 701/38; 701/37; 701/82; 701/90; 280/5.502

(58) Field of Classification Search ................... 701/37, 701/38, 82, 90; 280/5.501, 5.506, 5.507, 280/5.511, 124.106, 124.149, 5.502, 5.51
See application file for complete search history.

(56) References Cited

U.S. PATENT DOCUMENTS 5,384,705 A * 1/1995 Inagaki et al. ............. 701/38
6,175,792 B1 * 1/2001 Jones et al. ............... 701/37
6,425,585 B1 7/2002 Schuelke et al.
7,129,659 B2 * 10/2006 Buma et al. ............... 318/432

FOREIGN PATENT DOCUMENTS

| EP | 0 933 239 A1 | 8/1999 |
|----|--------------|--------|
| JP | 4-166408 | 6/1992 |
| JP | 5-016633 | 1/1993 |
| JP | 5-050819 | 3/1993 |

OTHER PUBLICATIONS

European Search Report dated Feb. 8, 2006.

\* cited by examiner

*Primary Examiner*—Thomas G. Black
*Assistant Examiner*—Christine M Behncke
(74) *Attorney, Agent, or Firm*—Buchanan Ingersoll & Rooney PC

(57) ABSTRACT

A suspension system for a vehicle includes a roll control device, which includes an actuator, for controlling roll, and a control device including a target control value determining portion determining target control value of the actuator and an operation control portion controlling the actuator on the basis of the target control value. The target control value determining portion determines the target control value on the basis of estimated lateral acceleration when degree of actual lateral acceleration is smaller than a predetermined threshold, and by weighting the estimated lateral acceleration to gradually decrease from one to zero and by weighting the actual lateral acceleration to gradually increase from zero to one when the actual lateral acceleration is greater than the predetermined threshold, the target control value determining portion determines the target control value of the actuator on the basis of the sum of the weighted estimated lateral acceleration and the weighted actual lateral acceleration.

7 Claims, 7 Drawing Sheets

SUSPENSION SYSTEM FOR VEHICLE

CROSS REFERENCE TO RELATED APPLICATIONS

This application is based on and claims priority under 35 U.S.C. § 119 with respect to Japanese Patent Application No. 2004-346544 filed on Nov. 30, 2004, the entire content of which is incorporated herein by reference.

FIELD OF THE INVENTION

The present invention relates to a suspension system for a vehicle. More particularly, the present invention pertains to controls of the roll control device of a suspension system for a vehicle, which includes a roll control device for controlling the roll of a vehicle body.

BACKGROUND

Known suspension systems including a roll control device, and controls of the suspension systems are described in JPH05 (1993)-50819A, JPH05 (1993)-16633A, JPH04 (1992)-166408A. According to the known suspension systems including the roll control device, a control value of the roll control device is determined using actual lateral acceleration which is actually generated lateral acceleration at a vehicle body, and estimated lateral acceleration which is estimated on the basis of vehicle traveling speed and a degree of steering.

According to the known suspension systems, gains of the actual lateral acceleration and the estimated lateral acceleration are varied on the basis of vehicle traveling speed and steering speed, or the like, for determining the control value in order to perform a control based on the estimated lateral acceleration in addition to a control based on the actual lateral acceleration in view of delay of control at initial stage of turning movement of the vehicle, swing back when returning a steering operation member, and excessive slip during the turning movement of the vehicle, or the like. Lateral acceleration is generated not only when a vehicle is turning, but also when a vehicle travels on a rough road even if the vehicle travels straight. Thus, it is desired to avoid the influence of the lateral acceleration when controlling the roll control device. With the foregoing known suspension systems, the aforementioned influence of the lateral acceleration is not considered, and in a practical use, the known suspension systems leave room for improvement.

A need thus exists for a suspension system for a vehicle including a roll control device, which can avoid influence of relatively small degree of lateral acceleration which is not caused by turning movement of the vehicle.

SUMMARY OF THE INVENTION

In light of the foregoing, the present invention provides a suspension system for a vehicle, which includes a roll control device, which includes an actuator, for controlling roll of a vehicle body by an actuation of the actuator, and a control device including a target control value determining portion determining target control value of the actuator on the basis of actual lateral acceleration actually generated at the vehicle body and estimated lateral acceleration estimated on the basis of steering operation amount and vehicle traveling speed and an operation control portion controlling the actuator on the basis of the target control value determined by the target control value determining portion. The target control value determining portion determines the target control value of the actuator on the basis of the estimated lateral acceleration when degree of the actual lateral acceleration is smaller than a predetermined threshold, and by weighting the estimated lateral acceleration to gradually decrease from one to zero and by weighting the actual lateral acceleration to gradually increase from zero to one in accordance with an increase of the actual lateral acceleration from the predetermined threshold when the degree of the actual lateral acceleration is greater than the predetermined threshold, the target control value determining portion determines the target control value of the actuator on the basis of the sum of the weighted estimated lateral acceleration and the weighted actual lateral acceleration.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

One embodiment of the present invention will be explained with reference to illustrations of drawing figures as follows.

Figure 1:
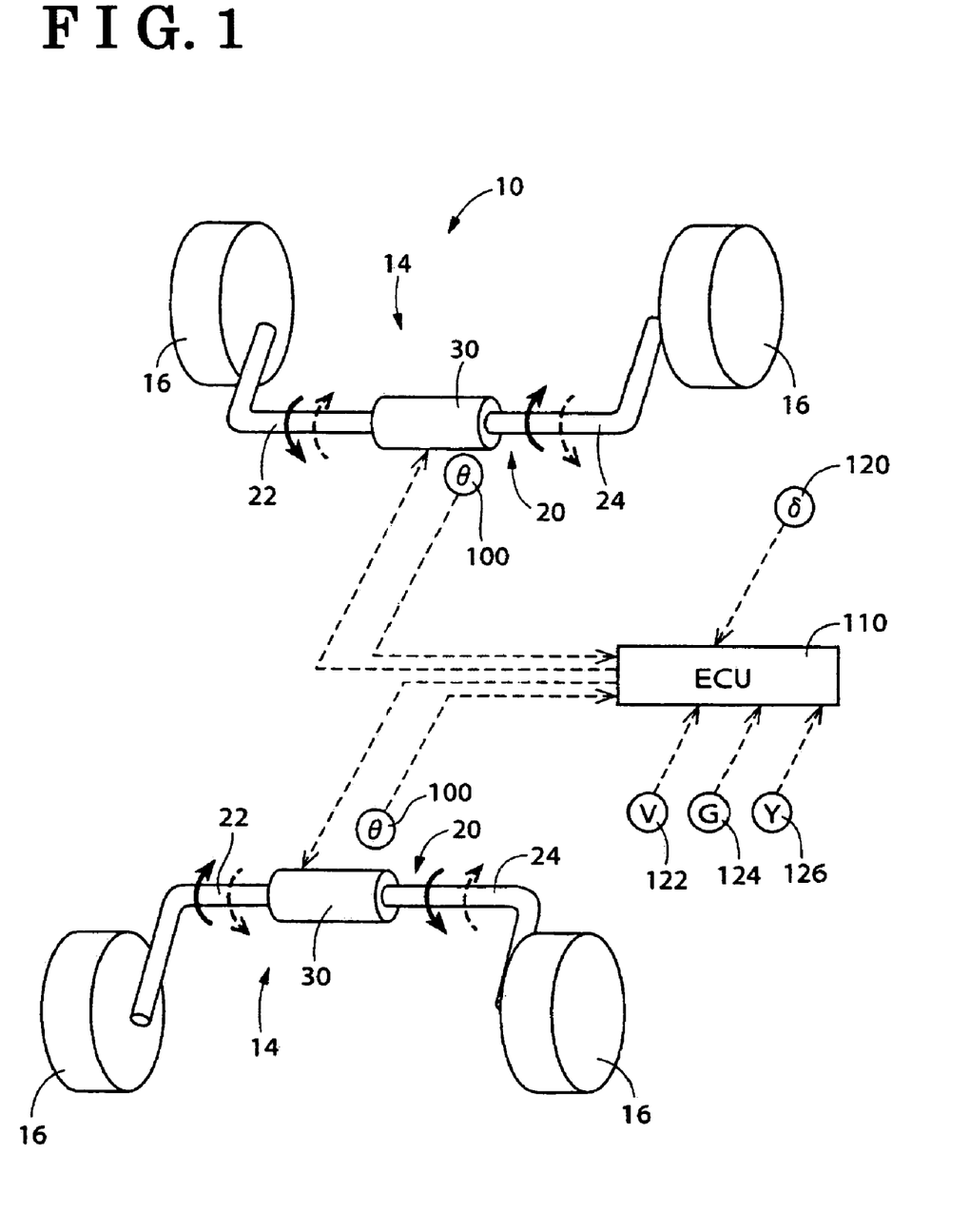
FIG. 1 is a view showing a suspension system for a vehicle according to an embodiment of the present invention.

As shown in FIG. 1, a suspension system 10 for a vehicle includes two stabilizers 14, 14 serving as a roll control device, each of the stabilizers 14, 14 are provided at front wheel side and rear wheel side respectively. The stabilizer 14 includes a stabilizer bar 20 which is connected to a wheel holding member for holding vehicle wheels 16, 16 at ends thereof. The stabilizer bar 20 is divided into two portions at a middle portion thereof, and the stabilizer bar 20 includes a pair of stabilizer bars, that is, a right-hand stabilizer bar 22 and a left-hand stabilizer bar 24. The stabilizer bar 22 and the stabilizer bar 24 are relatively rotatably connected through an actuator 30. The stabilizer 14 performs roll control of a vehicle body by varying elastic force of the entire stabilizer bar 20 by rotating the stabilizer bars 22, 24 relatively each other (shown with arrows in FIG. 1).

Figure 2:
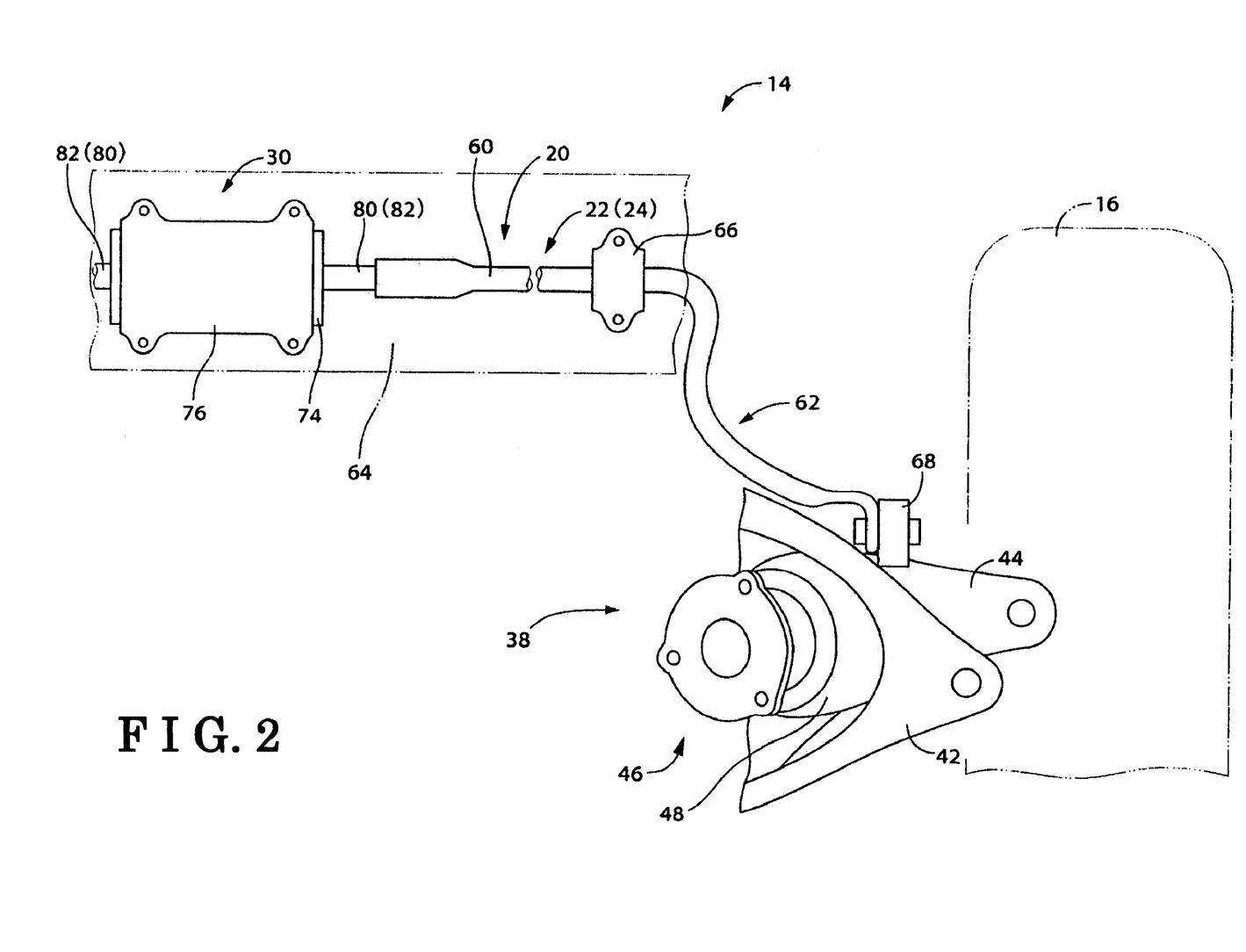
FIG. 2 is a partial view showing a stabilizer of the suspension system for the vehicle according to the embodiment of the present invention.

FIG. 2 partially shows a portion from the middle portion of one of the stabilizers 14 in a vehicle width direction to one of the wheels 16. The suspension system 10 includes independent suspension type four suspensions 38, each of the suspensions 38 is provided at each of four vehicle wheels 16. A known double wishbone type suspension is applied as the suspension 38. The suspension 38 is provided with an upper arm 42 and a lower arm 44 serving as wheel holding members, first ends of which are rotatably connected to the vehicle body, and second ends of which are connected to the vehicle wheel 16. The upper arm 42 and the lower arm 44 rotate about the first ends of the upper arm 42 and the lower arm 44 in accordance with approaching and separating movement (i.e., relative movement in upward and downward directions) between the vehicle wheel 16 and the vehicle body, and the second ends of the upper arm 42 and the lower arm 44 move upward and downward relative to the vehicle body. The suspension 38 further includes a shock absorber 46 and a suspension spring 48 (e.g., an air spring). The shock absorber 46 and the suspension spring 48 are connected to a member at a vehicle body side and a member at a vehicle wheel side respectively. With the foregoing construction, the suspension 38 generates damping force in response to oscillation caused by the approaching and separating movement between the vehicle wheel 16 and the vehicle body while elastically supporting the vehicle body and the vehicle wheel 16.

As explained above, the stabilizer 14 includes the right-hand stabilizer bar 22 and the left-hand stabilizer bar 24 that serve as a pair (i.e., one of the stabilizer bars 22, 24 is shown in FIG. 2). Each stabilizer bar 22, 24 includes a torsion bar portion 60 arranged extending in an approximately vehicle width direction and an arm portion 62 integrally formed with the torsion bar portion 60 and arranged to cross with the torsion bar portion 60 to be extended in approximately forward or rearward of the vehicle. The torsion bar portion 60 of each of the stabilizer bars 22, 24 is rotatably supported by a support member 66 which is fixed on a stabilizer arranging portion 64 which is a part of the vehicle body in the vicinity of the arm portion 62, and the stabilizer bars 22, 24 are coaxially arranged each other. The actuator 30 is positioned between ends (i.e., ends at central side in the vehicle width direction) of the torsion bars 60, 60. The end of the torsion bars 60 is connected to the actuator 30. On the other hand, an end of the arm portion 62 (i.e., an end which is at opposite side of the torsion bar portion 60) is connected to a stabilizer bar connecting portion 68 provided at the lower arm 44 to be relatively rotatable to the stabilizer bar connecting portion 68.

Figure 3:
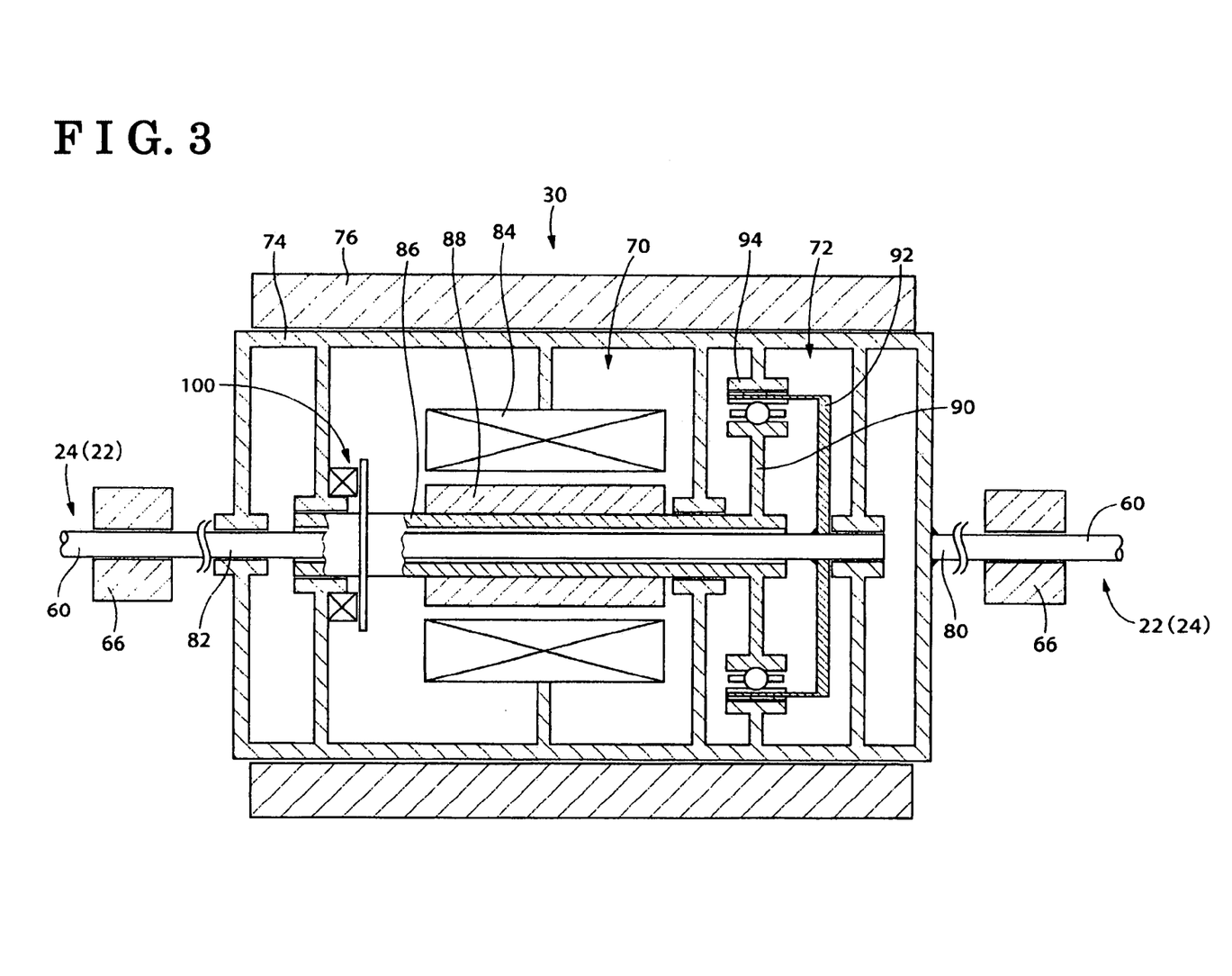
FIG. 3 is a cross-sectional view showing an actuator of the stabilizer according to the embodiment of the present invention.

The actuator 30, as shown in FIG. 3, includes an electric motor 70, and a deceleration mechanism 72 for decelerating rotation of the electric motor 70. The electric motor 70 and the deceleration mechanism 72 are housed in a housing 74 of the actuator 30. The housing 74 is held in the stabilizer arranging portion 64 by a housing holding member 76 so as to be rotatable, and to be immovable in an axial direction (i.e., in the approximately vehicle width direction). As shown in FIG. 2, output shafts 80, 82 are provided to be extended from respective ends of the housing 74. An end of the output shaft 80, 82 extended from the housing 74 is connected to the end of the stabilizer bar 22, 24 by means of serration fitting so as not to relatively rotate. As shown in FIG. 3, the output shaft 80 is fixed to an end portion of the housing 74, and the output shaft 82 is arranged being extended in the housing 74 and supported to be rotatable relative to the housing 74 and immovable in an axial direction. An end portion of the output shaft 82 extended in the housing 74 is connected to the deceleration mechanism 72 as explained hereinafter.

The electric motor 70 includes plural stator coils 84 fixed on the housing 74 on a circumference along an internal peripheral wall of the housing 74, a hollow motor shaft 86 and rotatably held by the housing 74, and a permanent magnet 88 arranged and fixed on an external periphery of the motor shaft 86 on a circumference facing the stator coils 84. A DC blushless motor is applied as the electric motor 70 in which the stator coils 84 serve as a stator and the permanent magnet 88 serves as a rotor.

The deceleration mechanism 72 includes a wave generator 90, a flexible gear (flexspline) 92, and a ring gear (circular spline) 94, and serves as a harmonic gear mechanism (i.e., also called as harmonic drive mechanism™, a strain-wave-gear ring, or the like). The wave generator 90 is constructed by fitting a ball bearing on an external periphery of an ellipse shape cam and is fixed to an external periphery at one end of the motor shaft 86. The flexible gear 92 is shaped in a cup configuration whose peripheral wall portion is elastically flexible, and plural teeth are formed on an external periphery of the peripheral wall portion at an opening side. The flexible gear 92 is supported by the output shaft 82. More particularly, the output shaft 82 penetrates through the motor shaft 86, and the flexible gear 92 and the output shaft 82 are connected by securing a bottom portion of the flexible gear 92 to the end portion of the output shaft 82 penetrated through the motor shaft 86. The ring gear 94 has an approximately ring shape, plural teeth (i.e., the number of teeth is slightly greater than that of the flexible gear, for example, by two) are formed on an internal periphery of the ring gear 94, and the ring gear 94 is fixed on the housing 74. A peripheral wall portion of the flexible gear 92 is outfitted on the wave generator 90, and the flexible gear 92 is elastically deformed in an ellipse shape. The flexible gear 92 is also engaged with the ring gear 94 at two portions positioned in a longitudinal axis direction of the ellipse, and is not engaged at other portions. Upon the rotation of the wave generator 90 by one cycle (i.e., 360 degrees), the flexible gear 92 and the ring gear 94 are relatively rotated by a difference of the numbers of the teeth. Because a construction of the harmonic gear mechanism is known, the construction of the deceleration mechanism 72 is not explained in detail.

With the foregoing construction, when the electric motor 70 is rotated, that is, when the actuator 30 is operated, the torsion bar portions 60, 60 are rotated relative to the right-hand stabilizer bar 22 and the left-hand stabilizer bar 24 respectively, and the stabilizer bar 20 serving as a single stabilizer bar by the combination of the right-hand stabilizer bar 22 and the left-hand stabilizer bar 24 is twisted (i.e., torsion). Torsional force generated by the torsion affects as a force which approximates or separates the vehicle wheels 16 and the vehicle body. In other words, with the stabilizer 14, elastic force of the stabilizer bar 20, that is, the torsional rigidity is varied by the operation of the actuator 30.

The actuator 30 includes a motor rotation angle sensor 100 for detecting the rotation angle of the motor shaft 86, that is, rotation angle of the electric motor 70, in the housing 74. The motor rotation angle sensor 100 primary includes an encoder in the actuator 30, and detected value by the motor rotation angle sensor 100 is used for switching energization phases of the electric motor 70, and, is used for the control of the actuator 30, that is roll control by the stabilizer 14, as an index of relative rotation angle (i.e., relative rotational position) of the stabilizer bars 22, 24.

Figure 4:
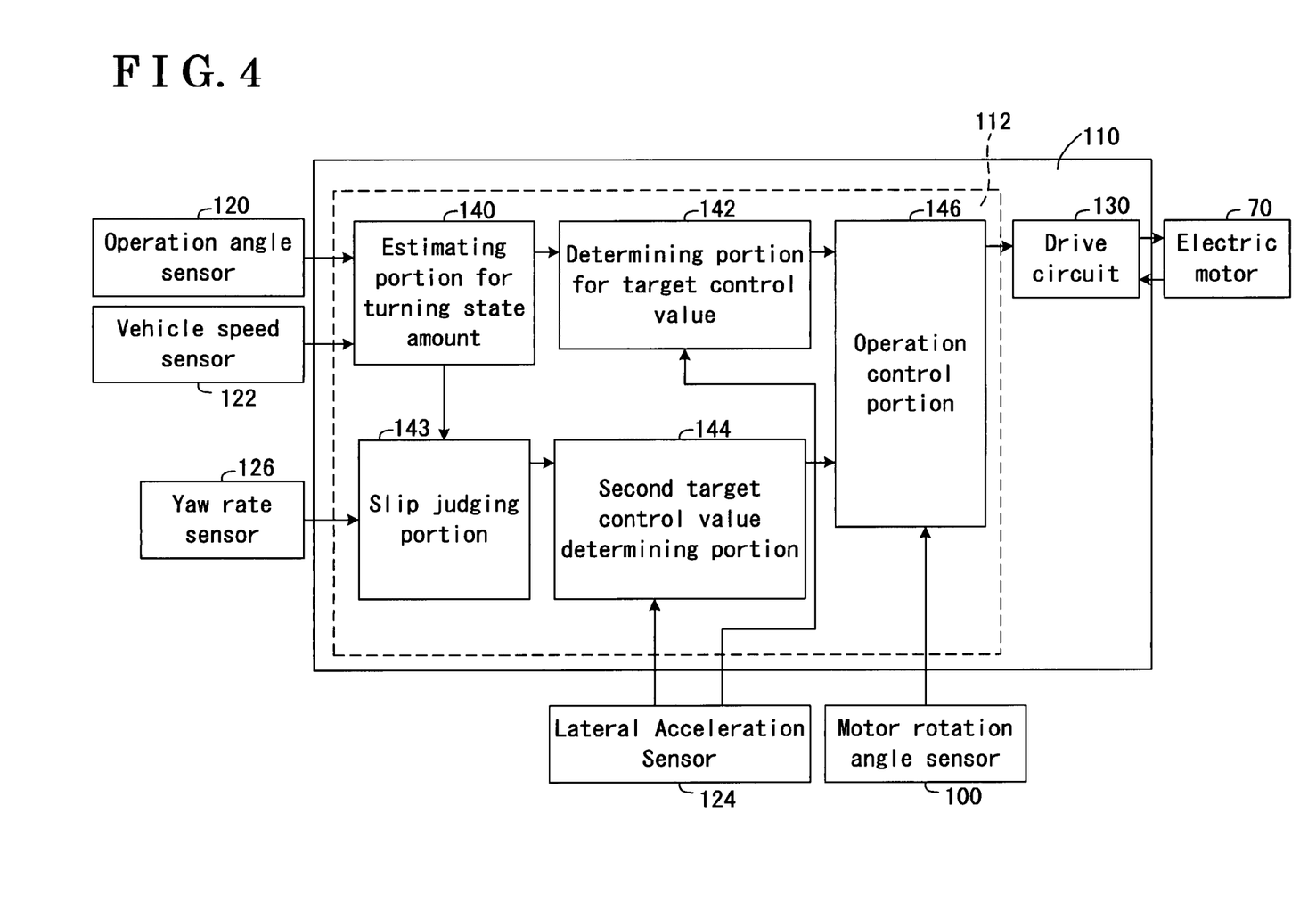
FIG. 4 is a block view showing functions of a stabilizer electronic control unit for controlling the stabilizer according to the embodiment of the present invention.

As shown in FIG. 1, the suspension system for the vehicle includes the stabilizer 14, and more particularly, a stabilizer electronic control unit (stabilizer ECU) 110 (i.e., hereinafter referred as ECU 110) serving as a control device for controlling the actuator 30. As shown in FIG. 4, the ECU 110 primarily includes a computer including a CPU, a ROM, and a RAM. The ECU 110 is connected to the motor rotation angle sensor 100, an operation angle sensor 120 for detecting an operation angle of a steering wheel, which is an operational amount (i.e., degree of operation) of a steering operation member as a steering amount (i.e., degree of steering), a vehicle speed sensor 122 for detecting vehicle traveling speed (i.e., hereinafter referred as vehicle speed), a lateral acceleration sensor 124 for detecting actual lateral acceleration which is actually generated at the vehicle body, and a yaw rate sensor 126 for detecting yaw rate which is actually generated at the vehicle body (i.e., those sensors are indicated as $\theta$, $\delta$, v, G, Y respectively in FIG. 1). The ECU 110 is also connected to the electric motor 70 of the actuator 30 through a drive circuit 130 (shown in FIG. 4). Various programs and data such as roll control program are memorized in the ROM of the computer 112 of the ECU 110.

As shown in FIG. 4, functionally, includes a turning state amount estimating portion 140 for estimating turning state amount such as lateral acceleration and yaw rate on the basis of detected result by the operation angle sensor 120 and the vehicle speed sensor 122, a target control value determining portion 142 for determining a target control value of the actuator 30 on the basis of estimated lateral acceleration estimated by the turning state amount estimating portion 140 and the actual lateral acceleration detected by the lateral acceleration sensor 124, a slip judging portion 143 for judging whether vehicle slip is excessive on the basis of an estimated yaw rate and the actual yaw rate detected by the yaw rate sensor 126, a second target control value determining portion 144 for determining target control value of the actuator 30 on the basis of the actual lateral acceleration when it is judged that the slip is excessive, and an operation control portion 146 for controlling operation of the actuator 30 on the basis of the target control value determined at either one of the target control value determining portions 142, 144.

The suspension system 10 with the foregoing construction generates a moment which is against roll moment of the vehicle body when the vehicle makes turn by the actuation of the actuator 30, and thus the roll of the vehicle body can be controlled. More particularly, lateral acceleration for control which is lateral acceleration for determining target control value for controlling the actuator 30 on the basis of the estimated lateral acceleration and the actual lateral acceleration is calculated. Based on the lateral acceleration for control, as target control value necessary for controlling the roll of the vehicle body, torsional angle of the stabilizer bar 20, that is, the target rotation angle of the electric motor 70 which corresponds to the relative rotation angle of the stabilizer bars 22, 24, is determined. Feedback control is performed on the basis of deviation between the target rotation angle and the actual rotation angle of the electric motor 70, and the electric current is supplied to the electric motor 70 in order to eliminate the deviation.

During the low vehicle speed and lateral acceleration is zero, the electric current is not supplied to the electric motor 70, and the actuator 30 is allowed to return to a neutral position which is an angle where the rotational angle of the electric motor 70 is set (i.e., an angle corresponding to a state where the stabilizer bar 20 is not twisted) by turning moment from the stabilizer bar 20 (i.e., input from the vehicle wheel 16). Because of the influence by internal friction of the actuator 30, cogging torque of the electric motor 70, and counter electromotive force, or the like, the actuator 30 may not return to the neutral position.

According to the suspension system 10 for the vehicle, the ECU 110 appropriately operates the stabilizer 14 by repeatedly executing the roll control program with very short time interval by means of the computer 112, and thus controls the roll of the vehicle body. The roll control of the vehicle body by the stabilizer 14 will be explained with reference to a flowchart shown in FIG. 5. Because two stabilizers 14, 14 provided on the suspension 10 are controlled by the identical manner, for explanatory purpose, the operation of one of the stabilizers 14 is explained for a control of the entire system.

Figure 5:
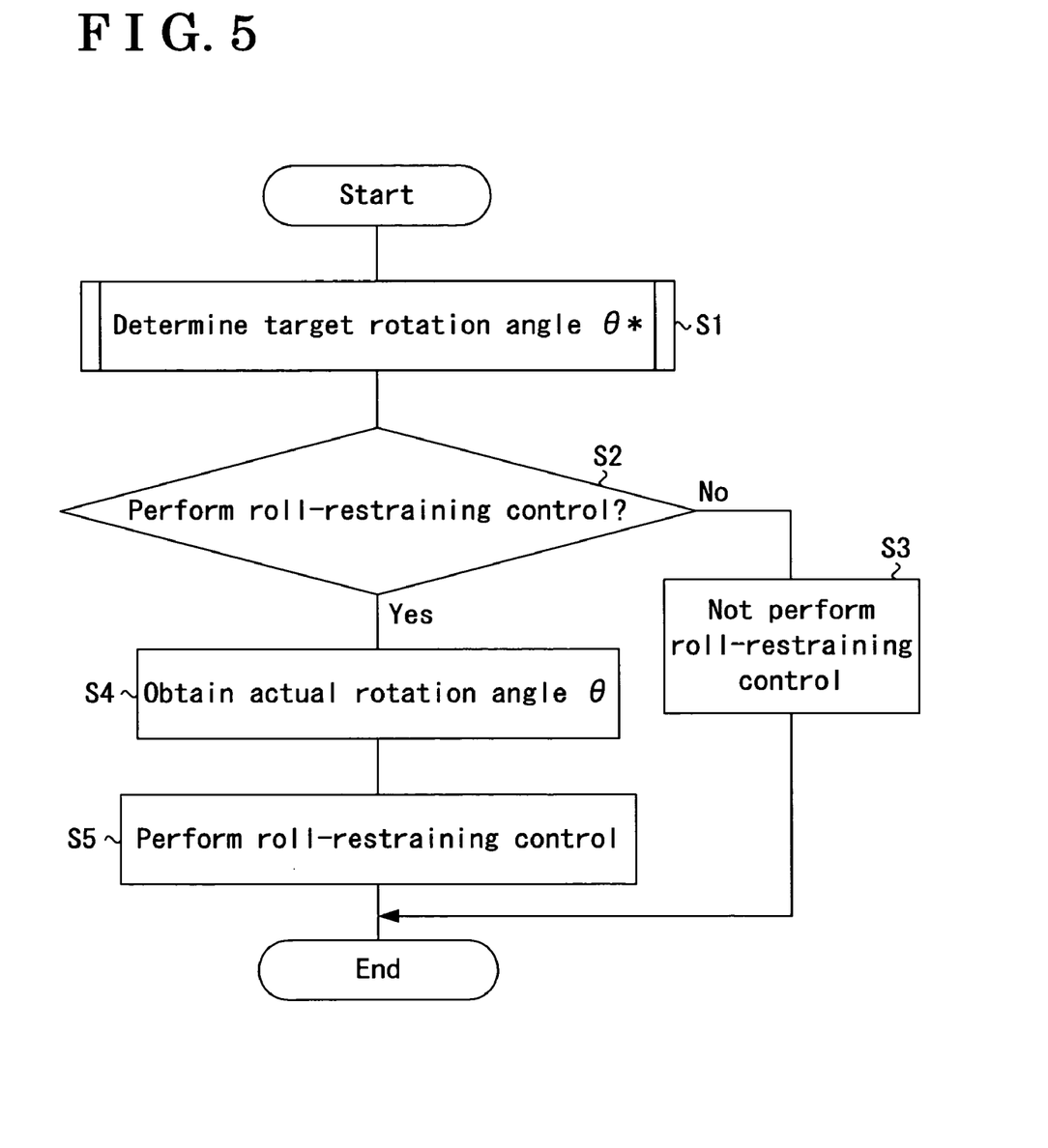
FIG. 5 is a flowchart of a roll control program, which is executed by the stabilizer electronic control unit according to the embodiment of the present invention.

First, at Step S1, a relative rotation angle of the stabilizer bars 22, 24 necessary for controlling the roll of the vehicle body, that is, the target rotation angle $\theta^*$ of the electric motor 70 which is the target control value of the actuator 30 is determined. The target rotation angle $\theta^*$ is determined by a target rotation angle determining routine, and a particular method for determining the target rotation angle $\theta^*$ by the target rotational angle determining routine will be explained in detail hereinafter. At Step S2, it is judged whether roll control should be performed at on-going routine. When the steering wheel is not operated, that is, when the operation angle $\delta$ of the steering wheel is positioned approximately at the neutral position for a predetermined terms, or when the vehicle speed v is slower than a predetermined threshold speed, it is judged NO at Step S2 because the degree of the roll of the vehicle is small and thus it is not necessary to control the roll. In this case, the transaction advances to Step S3 not to execute roll control (i.e., non-roll control is executed). When the roll control is not executed, the electric current is not supplied to the actuator 30, and the actuator 30 is allowed to return to the neutral position by the turning moment from the stabilizer bars 22, 24. The foregoing process completes a routine of the program.

On the other hand, when it is judged that the roll should be controlled at Step S2, the transaction advances to Step S4, and the actual rotation angle $\theta$ which is the current rotation angle of the electric motor 70 is obtained on the basis of the detected value of the motor rotation angle sensor 100. Thereafter, at Step S5, the roll control is executed. More particularly, as explained above, the feedback control is executed on the basis of deviation between the target rotation angle $\theta^*$ and the actual rotation angle $\theta$, and the electric current is supplied in order to eliminate the deviation. The execution of a routine of the program is completed in the foregoing manner.

Figure 6:
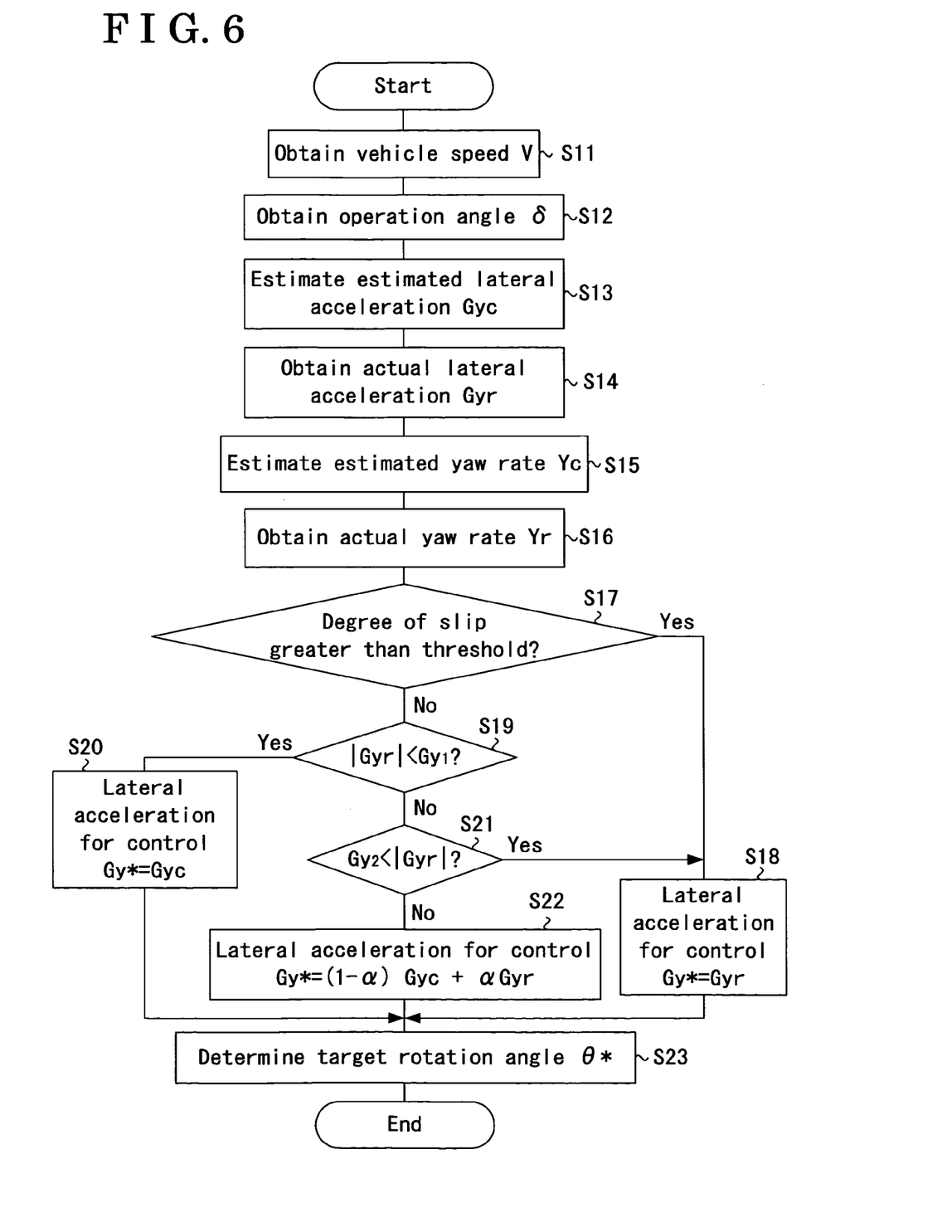
FIG. 6 is a flowchart of a target angle determining routine of the roll control program according to the embodiment of the present invention.

A target rotation angle determining routine for determining the target rotation angle $\theta^*$ of the electric motor 70 will be explained with reference to a flowchart shown in FIG. 6. In this routine, at Step S11, a vehicle speed v is obtained on the basis of the detected value of the vehicle sensor 122. At Step S12, an operation angle $\delta$ of the steering wheel is obtained on the basis of the detected value of the operation angle sensor 120 as the steering amount. At Step S13, estimated lateral acceleration Gyc is estimated on the basis of the vehicle speed v and the operation angle $\delta$. The estimated lateral acceleration Gyc is estimated referring to a map which is produced, in advance, and which has the vehicle speed and the operation angle as parameters on the basis of the vehicle characteristics. The estimated lateral acceleration may be estimated on the basis of a formula which is determined having the vehicle speed and the operation angle as parameters. At Step S14, the actual lateral acceleration Gyr which is actually generated at the vehicle body is obtained on the basis of the detected value of the lateral acceleration sensor 124. At Step S15, an estimated yaw rate Yc which is one of the estimated turning state amounts is estimated on the basis of the vehicle speed v and the operation angle $\delta$. The estimated yaw rate Yc can be estimated on the bass of a formula or a map which is produced in advance likewise the estimated lateral acceleration Gyc. In Step S15, the estimated yaw rate Yc is estimated on the basis of the map. At Step S16, the actual yaw rate Yr which is obtained on the basis of the detected value of the yaw rate sensor 126.

At Step S17, it is judged whether the slip angle of the vehicle is greater than a threshold value. When the absolute value of a difference between the estimated yaw rate Yc and the actual yaw rate Yr is greater than a predetermined threshold value, it is judged that the slip angle is great, and it is judged YES at Step S17. In those circumstances, the transaction advances to Step S18, and it is judged that the lateral acceleration Gy* for control which is an index for the roll control is equal to the actual lateral acceleration Gyr. More particularly, the lateral acceleration Gy* for control is a value set on the basis of the estimated lateral acceleration Gyc and the actual lateral acceleration Gyr for the roll control, and is used when determining the target rotation angle θ* of the electric motor 70 as the target control value. When the slip angle of the vehicle is greater than the threshold value, the actual lateral acceleration Gyr is set as the lateral acceleration Gy* for control irrespective of the degree of the actual lateral acceleration Gyr because it is not appropriate to determine the lateral acceleration Gy* for control on the basis of the estimated lateral acceleration Gyc.

At Step S17, when the slip angle is not greater than the threshold value, it is judged NO, and the transaction advances to Step S19 to judge whether the absolute value of the actual lateral acceleration Gyr is less than a first threshold value $Gy_1$. When the absolute value of the actual acceleration Gyr is less than the first threshold value $Gy_1$, it is judged YES at Step S19, the transaction advances to Step S20, and the lateral acceleration Gy* for control becomes equal to the estimated lateral acceleration Gyc. On the other hand, when the absolute value of the actual lateral acceleration Gyr is equal to or greater than the first threshold value $Gy_1$, it is judged NO at Step S19, and it is judged whether the absolute value of the actual lateral acceleration Gyr is greater than a second threshold value $Gy_2$ which is a value greater than the first threshold value $Gy_1$. When the absolute value of the actual lateral acceleration Gyr is greater than the second threshold value $Gy_2$, it is judged YES at Step S21, and the transaction advances to Step S18 where the lateral acceleration Gy* for control is set to be equal to the actual lateral acceleration Gyr. Because signs of the actual lateral acceleration Gyr is different depending on the turning directions of the vehicle, the absolute value of the actual lateral acceleration Gyr is adopted at the judgment of Step S21.

Figure 7:
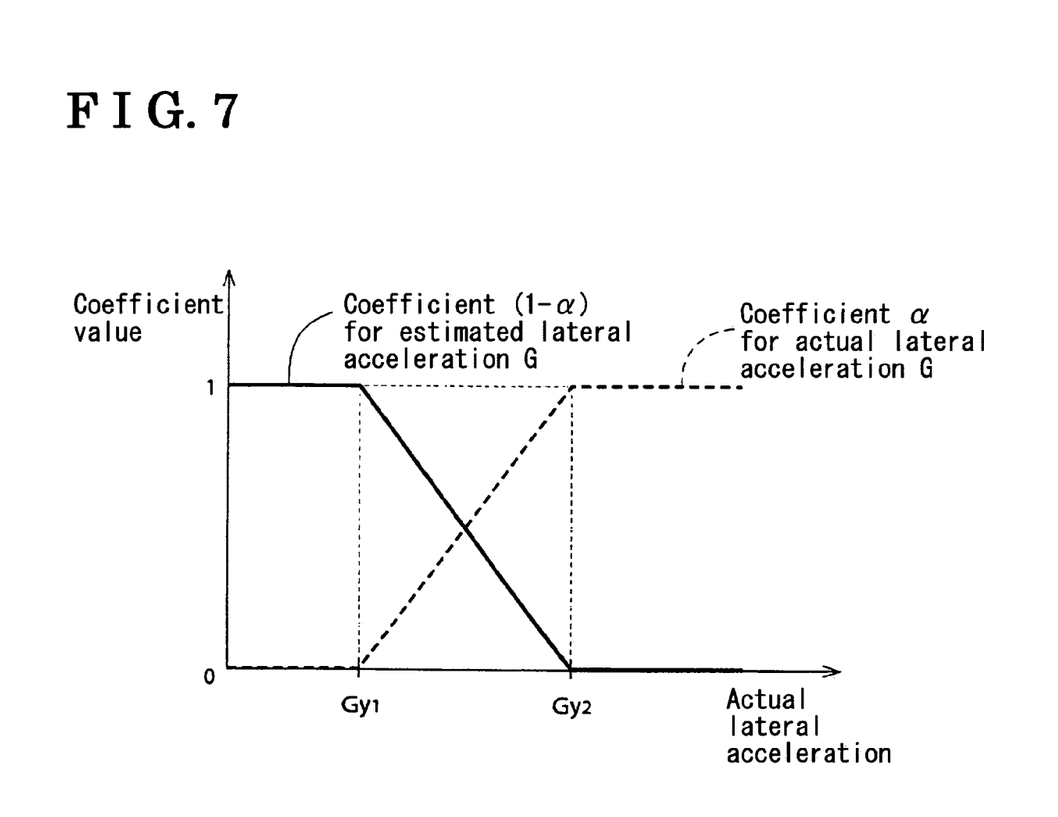
FIG. 7 is a chart showing a relationship between actual acceleration, and coefficient values for weighting the actual lateral acceleration and the estimated lateral acceleration.

At Step S21, when the absolute value of the actual lateral acceleration Gyr is equal to or less than the second threshold value $Gy_2$, that is, when the absolute value of the actual lateral acceleration Gyr is equal to or greater than the first threshold value and equal to or less than the second threshold value, it is judged NO, the transaction advances to Step S22, and the lateral acceleration Gy* for control is set at a value which is the sum of a value multiplying the actual lateral acceleration Gyr by the coefficient α, and a value multiplying the estimated lateral acceleration Gyc by the coefficient (1−α). The coefficient α for the actual lateral acceleration Gyr is, as shown in FIG. 7, determined as values linearly increasing from zero to one as an increment of the actual lateral acceleration Gyr from the first threshold value $Gy_1$ to the second threshold value $Gy_2$. The coefficient (1−α) for the estimate lateral acceleration Gyc is determined as values linearly decreasing from one to zero in accordance with the increment of the actual lateral acceleration Gyr from the first threshold value $Gy_1$ to the second threshold value $Gy_2$. According to the embodiment of the present invention, the first threshold value $Gy_1$ is set at the actual lateral acceleration which is not caused by the turning movement of the vehicle, in other words, set at the value which can effectively eliminate the influence of the actual lateral acceleration with relatively small degree which is generated when the vehicle travels on the rough road. The second threshold value $Gy_2$ is set at a value which can appropriately execute roll control without considering the estimated lateral acceleration Gyc.

After the lateral acceleration Gy* for control is determined at Steps S18, S20, and S22, the transaction advances to Step S23, and the target rotation angle θ* of the electric motor 70 is determined on the basis of the lateral acceleration Gy* for control. More particularly, the lateral acceleration for control and the data of the target rotational angle corresponding to the lateral acceleration for control are preset and memorized in the ROM, and the target rotation angle θ* is determined on the basis of the data. At Step S23, in place of the foregoing method, the target rotation angle θ* may be determined on the basis of the estimated roll angle by estimating the roll angle of the vehicle on the basis of the lateral acceleration Gy* for control.

As explained above, a portion for executing Step S13 and Step S15 for executing a part of the target rotation angle determining routine of the computer 112 of the ECU 110 serves as the turning state amount estimating portion 140. A portion which executes Step S17 serves as the slip judging portion 143. A portion which executes Step S18 and Step S23 serves as the target control value determining portion 142, and a portion which executes Step S18 serves as the second target control value determining portion 144. A portion that executes Step S2 through Step S5, which executes roll control program, serves as the operation control portion 146.

According to the suspension system 10 for the vehicle, because the target rotation angle θ* of the electric motor 70 included in the actuator 30, which is the target control value of the stabilizer 14 is determined on the basis of the actual acceleration Gyr and the estimated lateral acceleration Gyc and the target rotation angle θ* is determined on the basis of the estimated lateral acceleration Gyc when the actual lateral acceleration Gyr is smaller than the first threshold value $Gy_1$, the influence of the lateral acceleration which is not caused by the turning movement such as relatively small lateral acceleration deriving from the rough road surface can be removed. Further, when the actual lateral acceleration Gyr is greater than the second threshold value $Gy_2$, the target rotation angle θ* is determined on the basis of the actual lateral acceleration Gyr. When the actual lateral acceleration Gyr is equal to or greater than the first threshold value $Gy_1$ and equal to or less than the second threshold value $Gy_2$, the actual lateral acceleration Gyr is weighted to linearly increment from zero to one and the estimated lateral acceleration Gyc is weighted to linearly decrement from one to zero, and the target rotation angle θ* is determined on the basis of the sum of the weighted actual lateral acceleration Gyr and the weighted estimated lateral acceleration Gyc. A transition from a control based on the estimated later acceleration Gyc and a control primarily based on the actual lateral acceleration Gyr is smoothly performed. Further, when the slip becomes excessive, because the target rotation angle θ* is determined o the basis of the actual lateral acceleration irrespective of the degree of the actual lateral acceleration Gyr, an appropriate roll control can be performed when the excessive slip is generated.

With the suspension system for the vehicle according to the embodiment of the present invention, the influence of the lateral acceleration which is not caused by the turning movement, such as, the relatively small lateral acceleration caused by the rough road can be eliminated, and the transition between the control based on the estimated lateral acceleration and the control mainly based on the actual lateral acceleration is performed smoothly without a control gap. Accordingly, highly practical suspension system can be achieved.

According to the embodiment of the present invention, because the target control value is determined on the basis of the estimated lateral acceleration when the actual lateral acceleration is relatively small, the influence of the relatively small lateral acceleration which is not caused by the turning movement, or turning state, for example, which is caused by the rough road and crosswind, can be eliminated. Further, when the degree of lateral acceleration is large, the control is conducted primarily using the actual lateral acceleration. In those circumstances, transitions of the control between the control which uses the estimated lateral acceleration and the actual lateral acceleration is smoothly performed without accompanying stepwise variation of the control value. Using foregoing advantages, practical suspension system for a vehicle can be achieved.

Considering the actual turning movement of the vehicle, generation of the actual lateral acceleration is delayed relative to the turning operation. According to the embodiment of the present invention, because the roll control is performed on the basis of the estimated lateral acceleration at an initial stage of the turning movement where the actual lateral acceleration is relatively small, and the roll control is gradually switched to the control which mainly uses the actual lateral acceleration after the medium term of the turning movement where the actual lateral acceleration becomes relatively large, the roll control can be effectively performed at the turning movement.

According to the embodiment of the present invention, the construction of the roll control device of the suspension system is not limited to the particular construction, and known roll control devices can be adopted as long as the device can control the roll speed and roll amount (i.e., roll angle), or the like, of the vehicle by the actuation of the actuator. For example, a roll control device which includes a suspension cylinder (e.g., a shock absorber) which is connected to mount portions provided at wheel holding members and a vehicle body and which expands and contracts in accordance with relative movement between wheels and the vehicle body and, which controls roll speed by varying damping force of the suspension cylinder by an actuator may be adopted. Further, a roll control device which controls roll amount by actively varying a distance between wheels and a vehicle body by positively expanding and contracting a suspension cylinder by an actuator may be adopted. Still further, a roll control device which includes a stabilizer and varies elastic force of the stabilizer bar by an actuator, which actively varies a distance between wheels and a vehicle body can be adopted. The actuator may be operated by air pressure, hydraulic pressure such as oil pressure, and electromagnetic force such as an electromagnetic motor and a solenoid.

According to the embodiment of the device which mainly includes a computer can be adopted as the control device. The operation control portion which controls operation of the actuator on the basis of the target control value determined by the target control value determining portion can perform arbitrary controls such as feedback control and feed-forward control. The steering operation amount which is a base of the estimated lateral acceleration may be, for example, operation amount of the steering operation member such as the steering wheel, and may be steering amount such as moving amount of a steering rod provided at a steering device. The estimated lateral acceleration can be estimated, for example, by producing a map having vehicle traveling speed and steering amount of a steering wheel as parameters. The estimated lateral acceleration may also be estimated, for example, by setting a formula having vehicle traveling speed and steering amount of a steering wheel as parameters, and by calculating the estimated lateral acceleration based on the formula.

According to the embodiment of the present invention, when the actual lateral acceleration reaches the predetermined threshold, the control based on the lateral acceleration is performed. Because the roll control device is controlled on the basis of the actual lateral acceleration which has the actual state of the turning movement when the degree of the actual lateral acceleration is large to some extent, the roll of the vehicle body can be controlled appropriately.

According to the embodiment of the present invention, because the weighting in accordance with the increase of the actual lateral acceleration is linear, processing of the weighting is relatively easy, and the construction of the target control value determining portion can be simplified. More particularly, with the construction that the weighting is conducted between the first threshold and the second threshold, the coefficient $\alpha$ which linearly increases in accordance with an increase of the actual lateral acceleration is set, and the target control value is determined by adding a value multiplying the coefficient $\alpha$ by the actual lateral acceleration and a value multiplying $(1-\alpha)$ by the estimated lateral acceleration.

When the slip becomes excessive, a value of estimated lateral acceleration does not serve as an index of a state of turning movement of the vehicle, and is largely away from the actual lateral acceleration. According to the embodiment of the present invention, considering the foregoing, the control is performed on the basis of the actual lateral acceleration when the slip is excessive, and thus an appropriate roll control can be performed even when the excessive slip is generated. Whether the slip of the vehicle is excessive can be judged by comparing the estimated yaw rate estimated on the basis of the steering amount of the steering wheel and the vehicle traveling speed and the actual yaw rate detected by the sensor.

The stabilizer according to the embodiment of the present invention corresponds to an active stabilizer, and because roll control of the vehicle body can be performed separately from other controls for, such as, bouncing and pitching, with the suspension system according to the embodiment of the present invention, the effective roll control can be achieved. The construction of the stabilizer according to the embodiment of the present invention is not limited. For example, a stabilizer which varies elastic force of a stabilizer bar by providing a cylinder device serving as an actuator between an end portion of the stabilizer bar and a wheel holding member such as a suspension lower arm, and by expanding and contracting the cylinder device. Further, the stabilizer which varies elastic force of an entire stabilizer bar by dividing the stabilizer bar at middle portion thereof to form a pair of stabilizer bars, and by relatively rotating pair of the stabilizer bars by an actuator.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A suspension system for a vehicle, comprising:
    a roll control device, which includes an actuator, for controlling roll of a vehicle body by an actuation of the actuator;
    a control device including (a) a target control value determining portion determining target control value of the actuator on the basis of actual lateral acceleration actually generated at the vehicle body and estimated lateral acceleration estimated on the basis of steering operation amount and vehicle traveling speed; and (b) an operation control portion controlling the actuator on the basis of the target control value determined by the target control value determining portion;

wherein the target control value determining portion determines the target control value of the actuator on the basis of the estimated lateral acceleration when degree of the actual lateral acceleration is smaller than a predetermined threshold; and by weighting the estimated lateral acceleration to gradually decrease from one to zero and by weighting the actual lateral acceleration to gradually increase from zero to one in accordance with an increase of the actual lateral acceleration from the predetermined threshold when the degree of the actual lateral acceleration is greater than the predetermined threshold, the target control value determining portion determines the target control value of the actuator on the basis of sum of the weighted estimated lateral acceleration and the weighted actual lateral acceleration; and wherein the control device further includes a slip judging portion judging whether degree of a slip of vehicle is excessive, and a second target control value determining portion for determining target control value of the actuator on the basis of the actual lateral acceleration irrespective of degree of the actual lateral acceleration in place of determination by the target control value determining portion when the slip judging portion judges that a slip of the vehicle is excessive.

2. The suspension system for the vehicle according to claim 1, wherein by weighting the estimated lateral acceleration to gradually decrease from one to zero and by weighting the actual lateral acceleration to gradually increase from zero to one in accordance with an increase of the actual lateral acceleration from a first threshold to a second threshold when the degree of the actual lateral acceleration is greater than the first threshold and less than the second threshold determined at a value greater than the first threshold, the target control value determining portion determines the target control value of the actuator on the basis of sum of the weighted estimated lateral acceleration and the weighted actual lateral acceleration.

3. The suspension system for the vehicle according to claim 1, wherein the target control value determining portion linearly weights the estimated lateral acceleration and the actual lateral acceleration.

4. The suspension system for the vehicle according to claim 3, wherein the target control value determining portion sets a coefficient $\alpha$ which linearly increases relative to an increment of the actual lateral acceleration, and determines the target control value by adding a value obtained by multiplying $\alpha$ by the actual lateral acceleration and a value obtained by multiplying $(1-\alpha)$ by the estimated lateral acceleration, when the actual lateral acceleration is greater than a first threshold corresponding to the threshold value and less than a second threshold determined to be greater than the first threshold.

5. The suspension system for the vehicle according to claim 1, wherein the roll control device includes a stabilizer bar, each end of which is connected to wheel holding members at the right and the left of the vehicle; and the actuator is configured to vary elastic force of the stabilizer.

6. The suspension system for the vehicle according to claim 5, wherein the stabilizer bar includes a pair of stabilizer bar portions formed by dividing middle portion of the stabilizer bar; and elastic force of the stabilize bar is varied by relatively rotating said pair of stabilizer bar portions by the actuator.

7. The suspension system for the vehicle according to claim 1, wherein the slip judging portion judges the excessive slip by comparing an estimated yaw rate estimated on the basis of the steering operation amount and the vehicle traveling speed, and an actual yaw rate detected by a sensor.

\* \* \* \* \*